(12) United States Patent
Hanuschkin et al.

(10) Patent No.: US 12,522,047 B2
(45) Date of Patent: Jan. 13, 2026

(54) METHOD FOR ADJUSTING EXTERNAL AIR INTAKE IN AN INTERIOR OF A VEHICLE

(71) Applicant: MERCEDES-BENZ GROUP AG, Stuttgart (DE)

(72) Inventors: Alexander Hanuschkin, Weil der Stadt (DE); Stefan Studer, Stuttgart (DE); Florian Etter, Esslingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 480 days.

(21) Appl. No.: 17/928,956

(22) PCT Filed: May 28, 2021

(86) PCT No.: PCT/EP2021/064421
§ 371 (c)(1),
(2) Date: Dec. 1, 2022

(87) PCT Pub. No.: WO2021/244984
PCT Pub. Date: Dec. 9, 2021

(65) Prior Publication Data
US 2023/0219395 A1  Jul. 13, 2023

(30) Foreign Application Priority Data

Jun. 2, 2020 (DE) ............. 10 2020 003 282.6

(51) Int. Cl.
*B60H 1/00* (2006.01)
*G06V 10/82* (2022.01)
*G06V 20/56* (2022.01)

(52) U.S. Cl.
CPC ......... *B60H 1/008* (2013.01); *B60H 1/00771* (2013.01); *G06V 10/82* (2022.01); *G06V 20/56* (2022.01)

(58) Field of Classification Search
CPC .. B60H 1/008; B60H 1/00771; B60H 1/0073; G06V 10/82; G06V 20/56; Y02B 30/70; G06F 18/24133
(Continued)

(56) References Cited

U.S. PATENT DOCUMENTS

| 5,259,813 A | 11/1993 | Abthoff et al. |
| 9,682,610 B2 | 6/2017 | Duan et al. |

(Continued)

FOREIGN PATENT DOCUMENTS

| CN | 105593040 A | 5/2016 |
| CN | 106548258 A | 3/2017 |

(Continued)

OTHER PUBLICATIONS

Office Action dated Feb. 27, 2025 in related/corresponding CN Application No. 202180040073.1.

(Continued)

*Primary Examiner* — Allen R. B. Schult
*Assistant Examiner* — William C Weinert
(74) *Attorney, Agent, or Firm* — PATENT PORTFOLIO BUILDERS PLLC

(57) ABSTRACT

A method for adjusting external air intake in an interior of a vehicle involves continuously identifying an interior pollution level during a driving operation of the vehicle using recorded signals of a pollution sensor arranged in the interior. A pollution level of external air on a section of road ahead of the vehicle is predicted and the external air intake is automatically regulated depending on the predicted pollution level of the external air.

22 Claims, 1 Drawing Sheet

(58) Field of Classification Search
USPC .......................................................... 475/75
See application file for complete search history.

(56) References Cited

U.S. PATENT DOCUMENTS

| | | | |
|---|---|---|---|
| 11,938,784 | B2 | 3/2024 | Liu et al. |
| 2016/0318368 | A1 | 11/2016 | Alger et al. |
| 2017/0113512 | A1* | 4/2017 | Park ........................ G06V 40/18 |
| 2018/0005407 | A1* | 1/2018 | Browning ............... G05D 1/024 |
| 2018/0015804 | A1* | 1/2018 | McNew ............. B60H 1/00849 |

FOREIGN PATENT DOCUMENTS

| | | | | |
|---|---|---|---|---|
| CN | 110239577 | A * | 9/2019 | ........... B60H 1/0073 |
| DE | 4106078 | A1 | 9/1992 | |
| DE | 102017220350 | A1 | 6/2018 | |
| DE | 102018210587 | A1 | 1/2020 | |
| FR | 3051147 | A1 | 11/2017 | |
| JP | 201777885 | A | 4/2017 | |
| JP | 202037304 | A | 3/2020 | |
| KR | 20170130118 | A | 11/2017 | |
| WO | 2007031525 | A1 | 3/2007 | |
| WO | 2019127085 | A1 | 7/2019 | |

OTHER PUBLICATIONS

Office Action dated Aug. 30, 2024 in related/corresponding KR Application No. 10-2022-7041517.

Office Action dated May 10, 2024 in related/corresponding EP Application No. 21730521.8 with machine translation.

International Search Report and Written Opinion mailed Sep. 9, 2021 in related/corresponding International Application No. PCT/EP2021/064421.

Office Action created Jan. 11, 2021 in related/corresponding DE Application No. 10 2020 003 282.6.

Decision of Refusal dated Jan. 9, 2024 in related/corresponding JP Application No. 2022-572267.

Office Action dated Jun. 13, 2025 in related/corresponding CN Application No. 202180040073.1.

* cited by examiner

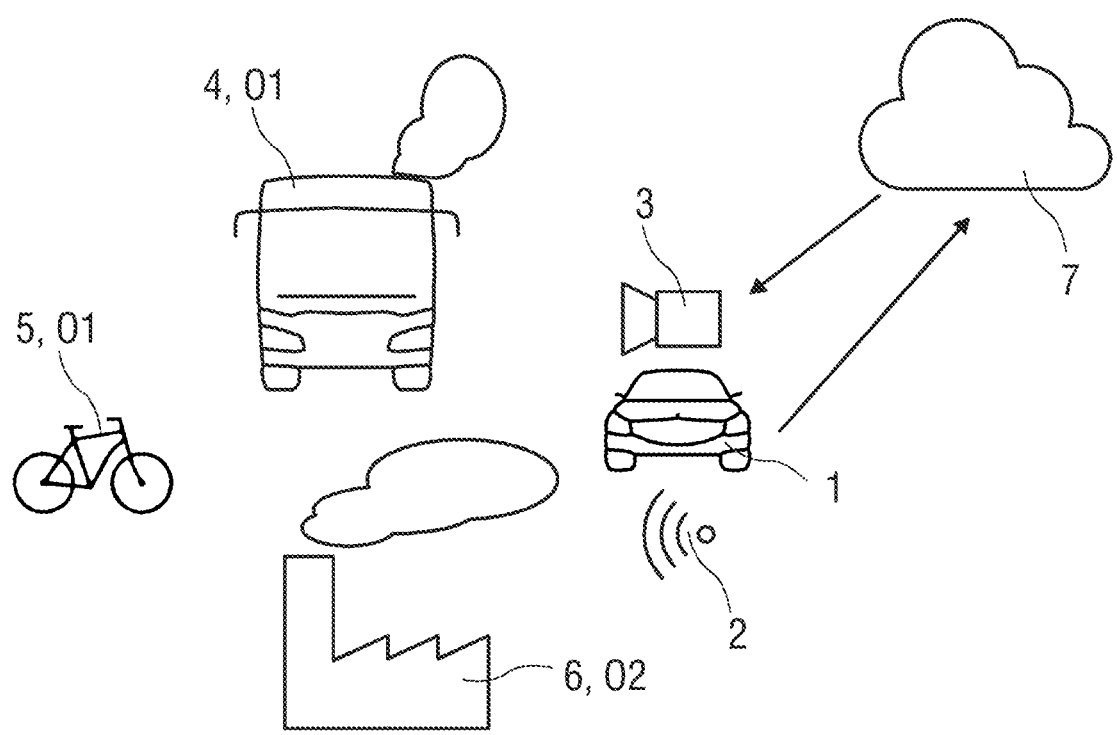

METHOD FOR ADJUSTING EXTERNAL AIR INTAKE IN AN INTERIOR OF A VEHICLE

BACKGROUND AND SUMMARY OF THE INVENTION

Exemplary embodiments of the invention relate to a method for adjusting external air intake in an interior of a vehicle, wherein an interior pollution level is continuously identified during a driving operation of the vehicle by means of recorded signals of a pollution sensor arranged in the interior.

A device and a method for adjusting the ventilation of an interior of a motor vehicle depending on signals from a pollution sensor, which is generally only exposed to external air, is known from DE 41 06 078 A1. A switch between a ventilation mode and an air recirculation mode thereby occurs depending on a concentration of pollutants. Depending on the sensor signals, on the respective operating mode (ventilation or air recirculation), as well as on specified and viewable experiential values, a first amount, which is correlated with the concentration of pollutants in the interior, is determined and is compared with a second amount, which is derived from the sensor signals and is correlated with the concentration of pollutants in the external air, by means of a computer. According to the result of this comparison, either the ventilation mode or the air recirculation mode is turned on.

Furthermore, a method for controlling air quality inside an interior of a vehicle based on a predicted air quality is known from US 2016/0 318 368 A1. Air quality data is thereby received by means of a vehicle sensor that is assigned to the vehicle and a sensor of another vehicle or an external environmental sensor or a source of information arranged remotely. Furthermore, a first air quality measurement for an environment of a vehicle, a second air quality measurement for the interior of the vehicle based on the air quality data, and a control signal based on the air quality measurements are determined. The control signal is sent to an air conditioning system of the vehicle for automatic control of the air quality inside the interior of the vehicle.

Exemplary embodiments of the invention are directed a method for adjusting external air intake in an interior of a vehicle.

A method for adjusting external air intake in an interior of a vehicle provides that an interior pollution level is continuously identified during a driving operation of the vehicle by means of recorded signals of a pollution sensor that is arranged in the interior. According to the invention, a pollution level of external air on a section of road ahead of the vehicle is predicted, wherein the external air intake is automatically regulated depending on the predicted pollution level of the external air.

The pollution level of the external air of the vehicle is thereby determined by means of visual information, which is identified by means of recorded signals from at least one vehicle-mounted visual recording unit. In particular, the recorded visual information is further processed and evaluated to identify the pollution level of the external air.

It is thus possible to extract semantic information from the recorded visual information, wherein in particular methods of machine learning, e.g., a method for object recognition, are used to this end. For example, if necessary, templates that are compared with an object detected in the visual information in order to recognize which kind of object is in an environment of the vehicle, can be saved in the vehicle.

By using the method, the ride comfort in the interior of the vehicle is increased and the health of occupants in the interior is protected. In particular, the health of the occupants is protected in that the external air intake, i.e., air intake in a ventilation of the interior of the vehicle is stopped or at least reduced in the case of an expected high future pollution level of the external air. By means of the method, the external air intake into the interior is thus lowered before pollutants enter the interior of the vehicle with the external air. Additionally, in a possible further development, a fingerprint for identifying pollution-producing objects in signals from the at least one visual recording unit that will be recorded in the future is extracted using the visual information. By means of the fingerprint it can thus be achieved that, during a development of a model for adjusting external air intake, undefined and known and thus unconsidered objects can be identified.

In a further embodiment of the method, pollution-producing stationary objects and moving objects in the visual information about an environment of the vehicle are recorded as semantic information, wherein, for example, a lorry driving in front of the vehicle and a trailer of a tractor loaded with manure, so-called slurry, are recognized as pollution-producing moving objects and the external air intake into the interior is switched off.

Furthermore, the method provides in a further possible embodiment that a current position of the vehicle is continuously identified, so that it is, for example, possible, depending on the current position, to record that the vehicle is in an industrial area, e.g., in the immediate vicinity of an industrial plant. In such a case, the external air intake into the interior of the vehicle is also at least reduced.

Furthermore, the method provides in a further possible embodiment for enriching the current position with temporal information, e.g., the time and the day of the week, so that it is, for example, possible to record, based on the current position and the current day of the week, that the vehicle is in particular in an industrial area on a working day, e.g., in the immediate vicinity of an industrial plant. In such a case, the external air intake into the interior of the vehicle is also at least reduced.

Based on the extracted semantic information, on the extracted fingerprint, and/or by means of the identified current position of the vehicle, a time-delayed model in the vehicle is trained in such a way that the interior pollution level is predicted as a set target. Such a model thus takes into account a time delay and a temporal integration of the pollution level of the external air of the vehicle.

The method further provides that the time delay between a high interior pollution level and a cause extracted by the model is determined. The model trained in this way is used in the vehicle in order to predict an expected future interior pollution level of the vehicle by means of input information, in particular by means of the semantic information, of the fingerprint, in particular of a so-called perception fingerprint and/or the current position of the vehicle. It is thereby possible to regulate the external air intake in such a way that as little pollution as possible enters the interior, in order to thus protect the health of the occupants.

In a further possible embodiment, the trained model, that is in particular included in the vehicle, is supplied to a central computer unit, so that this model can be merged or aggregated with at least one further model of a further vehicle.

This model and/or an aggregated model can then be provided to further vehicles of a vehicle fleet by means of the central computer unit and adjusting the external air intake of a respective further vehicle of the vehicle fleet is provided for.

Exemplary embodiments of the invention are explained in more detail in the following, using a drawing.

BRIEF DESCRIPTION OF THE SOLE FIGURE

Here:

The sole FIGURE schematically shows a vehicle with a pollution sensor and a visual recording unit as well as different stationary and moving objects in an environment of the vehicle.

DETAILED DESCRIPTION

The sole FIGURE illustrates a vehicle 1 with a pollution sensor 2 and a visual recording unit 3 in the form of a camera, wherein in addition a lorry 4 and a bicycle 5 are shown as moving objects O1, an industrial plant 6 is shown as a stationary object O2, and a central computer unit 7 is shown.

The pollution sensor 2 is arranged in an interior of the vehicle 1 and continuously records signals during a driving operation of the vehicle 1, based on which signals the pollution level of the interior is identified. Alternatively, or additionally to the pollution sensor 2, a sensor can also be arranged in the interior of the vehicle 1 that records signals, based on which smells that are perceptible to humans can be recognized.

The pollution level of the interior that is identified based on recorded signals of the pollution sensor 2 represents a time-delayed and time-integrated function of a pollution level of an external environment of the vehicle 1, i.e., of external air.

If an interior pollution level is identified based on the recorded signals of the pollution sensor 2, a ventilation of an interior of the vehicle 1 is controlled, as is known from the prior art.

In order to perform an adjustment of an external air intake in the interior of the vehicle 1, in which the interior pollution level is kept as low as possible, so that a health of occupants can be protected in terms of a pollution level, a method described in the following is provided.

A pollution level of the external air on a section of road ahead of the vehicle 1 is thereby predicted and the external air intake is automatically regulated depending on the predicted pollution level.

In particular, the method provides that the external air intake into the interior of the vehicle 1 is turned off if a comparatively high pollution level of the external air is expected in the future. By means of the method, the external air intake is thus reduced before pollutants enter the interior of the vehicle 1 with the external air.

As described above, signals are continuously recorded during the driving operation of the vehicle 1 by means of the pollution sensor 2 in the vehicle, based on which signals an interior pollution level is determined.

The vehicle 1 has the visual recording unit 3 in the form of the camera, the recording area of which is directed in front of the vehicle 1 and by means of which signals are continuously recorded during the driving operation of the vehicle 1, based on which signals an environment of the vehicle 1 and objects O1, O2 in this environment are detected.

Furthermore, the vehicle 1 comprises a satellite-supported position-determining unit that is not shown in more detail and a digital map, so that a current position of the vehicle 1 can be determined.

Based on the recoded signals of the visual recording unit 3, visual information is identified, which is evaluated.

Based on the visual information, semantic information can thereby be extracted by means of methods of machine learning, wherein, in particular, object recognition is used in relation to known objects O1, O2. I.e., it can be recognized which objects O1, O2 are in the environment of the vehicle 1. The objects O1, O2 detected in the environment of the vehicle 1 can, in particular, be differentiated into moving objects O1 and stationary objects O2.

Additionally, based on the semantic information, it can also be identified which of the objects O1, O2 produce pollution. If, e.g., a bicycle 5 is detected as a moving object O1 in the environment of the vehicle 1, then based on certain features of the bicycle 5 it is recognized that it is a bicycle 5, which does not produce pollution.

Furthermore, a fingerprint, in particular a perception fingerprint, can be extracted based on the visual information, for example by means of convolutional neural networks, without it being necessary to assign predefined objects O1, O2. During a development of a model created by means of the method that is discussed further below, non-predefined and known objects O1, O2 can thereby by identified by means of the fingerprint or by means of several extrapolated fingerprints.

Based on the semantic information, the perception fingerprint and/or based on position information identified due to the current position of the vehicle 1, a time-delayed model in the vehicle 1 is trained with machine learning methods. The model is thereby trained in such a way that a measured interior pollution level is predicted as a set target. The model can, for example, be a regression model or a model using reinforcement learning.

In the model, a time delay and a temporal integration of the pollution level of the external air is taken into account, for example by using time series information.

Such a model implicitly enables determining the time delay between a comparatively high interior pollution level, in particular a pollution level that exceeds a predetermined threshold, and a cause for a comparatively high pollution level of the external air that is identified by the model. For example, such a cause of the high pollution level is a lorry 4 and/or a tractor with a trailer full of manure, so-called slurry, driving in front of the vehicle.

This model trained in such a way is used in the vehicle 1, in order to predict an expected interior pollution level of the vehicle 1 by means of input information, in particular by means of the semantic information, of the perception fingerprint and/or position information. If a future comparatively high interior pollution level is predicted, then an interior ventilation is regulated in such a way that the external air intake into the interior of the vehicle 1 is reduced or switched off according to the predicted interior pollution level.

In one embodiment, the model can be pre-trained during a development of the vehicle 1, wherein the model can also be user- or region-specifically trained and/or trained further in further vehicles of a vehicle fleet.

It is also conceivable that general, user- and/or region-specific models be merged or aggregated in a central computer unit 7, for example of a vehicle manufacturer, by distributed learning, so-called federated learning, based on experiences of the further vehicles of the vehicle fleet.

The model additionally enables a recognition of causes of a comparatively high pollution concentration, e.g., a lorry 4 and/or an industrial plant 6, which can be region-specific. Such information can, for example, be used to identify sources of a comparatively high pollution concentration in the environment of the vehicle 1 in a country- and/or region-specific way.

By means of the central computer unit 7, the respective models and/or the aggregated model can be made available to the vehicle 1 and to the further vehicles of the vehicle fleet.

The method thus provides that, by means of visual information from the visual recording unit 3, a geolocation, i.e., a current position of the vehicle 1, and, based on the pollution sensor 2, a model, is trained, which predicts the interior pollution level, i.e., an interior pollution concentration, in particular based on the visual information.

For example, known moving objects O1 and stationary objects O2 can correlate with a comparatively high pollution level of the external air and thus also correlate in a time-delayed manner with a comparatively high interior pollution level, wherein the presented model learns this correlation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for adjusting external air intake in an interior of a vehicle, the method comprising:
   continuously determining, during a first period of time of a driving operation of the vehicle, a current position of the vehicle and a current interior pollution level, the current interior pollution level being determined using recorded signals of a pollution sensor arranged in the interior of the vehicle;
   continuously recording, using at least one visual recording unit mounted in the vehicle, current visual information;
   extracting, using object recognition, semantic information from the continuously recorded current visual information;
   extracting, using the continuously recorded current visual information, fingerprints identifying a plurality of objects identified in the continuously recorded current visual information;
   training a model predicting a time delay between a plurality of interior pollution levels and at least one of the plurality of objects identified in the continuously recorded current visual information, wherein the training of the model is based on the continuously determined current position of the vehicle, the continuously determined current interior pollution level, the semantic information extracted from the continuously recorded current visual information, and the fingerprints extracted using the continuously recorded current visual information;
   extracting, during a second, subsequent time period of the operation of the vehicle, at least one fingerprint of at least one object in current visual information recorded during the subsequent time period;
   predicting a time delay until a pollution level of external air on a section of road ahead of the vehicle exceeds a predetermined threshold, wherein the time delay is predicted using the trained model and based on matches between
      the at least one fingerprint of at least one object in current visual information recorded during the second, subsequent time period, and
      at least one fingerprint identified in the continuously recorded current visual information during the first period of time as a pollution-producing object; and
   automatically regulating the external air intake based on the predicted time delay.

2. The method of claim 1, wherein pollution-producing moving objects and stationary objects in the visual information about an environment of the vehicle are recorded as the semantic information.

3. A method comprising:
   continuously determining, during a driving operation of a first vehicle, an interior pollution level using recorded signals of a pollution sensor arranged in the interior of the vehicle;
   continuously determining, during the driving operation of the first vehicle, a current position of the first vehicle;
   identifying, using recorded signals from at least one vehicle-mounted visual recording unit of the first vehicle, first visual information;
   extracting, using object recognition, semantic information from the first identified visual information;
   extracting, using the first visual information, a first fingerprint identifying a pollution-producing object in the first visual information;
   training, in the first vehicle, a model predicting a time delay between the interior pollution level and the identified pollution-producing object, wherein the training of the model is based on the continuously determined current position of the vehicle, the continuously determined current interior pollution level, the extracted semantic information, and the first fingerprint;
   supplying the trained model to a central computer unit;
   supplying, by the central computer unit to a second vehicle, the trained model;
   identifying, using recorded signals from at least one vehicle-mounted visual recording unit of the second vehicle, second visual information;
   extracting, by the second vehicle using the second visual information, a second fingerprint;
   determining, by the second vehicle, that the second fingerprint matches the first fingerprint;
   determining a time delay between a high interior pollution level and a cause of the high pollution level extracted by the model; and
   automatically regulating, during the subsequent time period and based on the determined time delay, an external air intake of the second vehicle.

4. A method for adjusting an external air intake in an interior of a vehicle, the method comprising:
   determining, during a driving operation of the vehicle, an interior pollution level using recorded signals of a pollution sensor arranged in the interior of the vehicle;
   determining, during the driving operation of the vehicle, a current position of the vehicle;

identifying, using recorded signals from at least one vehicle-mounted visual recording unit, visual information;

extracting, using object recognition, semantic information from the identified visual information;

extracting, using the visual information, a plurality of fingerprints identifying a corresponding plurality of pollution-producing objects in the recorded signals;

determining, by a trained time-delay model using the current position, the extracted semantic information, and the extracted fingerprints, a time delay between the interior pollution level and a cause of the interior pollution level; and automatically adjusting, based on the determined time delay, the external air intake.

5. The method of claim 1, wherein the extracting the semantic information from the continuously recorded current visual information comprises comparing one or more templates with an object identified in the continuously recorded current visual information.

6. The method of claim 1, wherein the automatically regulating the external air intake comprises stopping or reducing external air into the interior of the vehicle.

7. The method of claim 1, wherein the model is a regression model or a model using reinforcement learning.

8. The method of claim 1, wherein the model uses time series information to account for the time delay and a temporal integration of a pollution level of the external air.

9. The method of claim 1, wherein the model is region-specifically trained.

10. The method of claim 1, wherein the model learns, for a plurality of known pollution-producing objects, a correlation of an exterior pollution level and an interior pollution level.

11. The method of claim 3, wherein the extracting the semantic information from the first visual information comprises comparing one or more templates with an object identified in the first visual information.

12. The method of claim 3, wherein the automatically regulating the external air intake comprises stopping or reducing external air into the interior of the vehicle.

13. The method of claim 3, wherein the model is a regression model or a model using reinforcement learning.

14. The method of claim 3, wherein the model uses time series information to account for the time delay and a temporal integration of a pollution level of the external air.

15. The method of claim 3, wherein the model is region-specifically trained.

16. The method of claim 3, wherein the model learns, for a plurality of known pollution-producing objects, a correlation of an exterior pollution level and an interior pollution level.

17. The method of claim 4, wherein the extracting the semantic information from the visual information comprises comparing one or more templates with an object identified in the visual information.

18. The method of claim 4, wherein the automatically regulating the external air intake comprises stopping or reducing external air into the interior of the vehicle.

19. The method of claim 4, wherein the model is a regression model or a model using reinforcement learning.

20. The method of claim 4, wherein the model uses time series information to account for the time delay and a temporal integration of a pollution level of the external air.

21. The method of claim 4, wherein the model is region-specifically trained.

22. The method of claim 4, wherein the model learns, for a plurality of known pollution-producing objects, a correlation of an exterior pollution level and an interior pollution level.

* * * * *